F. J. KENT.
CERTIFICATE OF DEPOSIT.
APPLICATION FILED MAR. 30, 1908.

910,070.

Patented Jan. 19, 1909.

Witnesses
L. B. James
Samuel H. Errick

Inventor,
Frank J. Kent.

UNITED STATES PATENT OFFICE.

FRANK J. KENT, OF WASHINGTON, DISTRICT OF COLUMBIA, ASSIGNOR TO M. A. FANNING OF CLEVELAND, OHIO.

CERTIFICATE OF DEPOSIT.

No. 910,070.　　　　Specification of Letters Patent.　　　Patented Jan. 19, 1909.

Application filed March 30, 1908. Serial No. 424,139.

*To all whom it may concern:*

Be it known that I, FRANK J. KENT, a citizen of the United States, residing at Washington, in the District of Columbia, have invented a new and useful Improvement in Certificates of Deposit, of which the following is a specification.

The invention relates to bank money orders of the general type shown in Patent No. 763,728 granted June 28, 1904, to A. W. Moore for certificate of deposit, and one of the objects of the invention is to more completely secure the depositor, depositary, and intermediate holders.

A further object, attained in the furtherance of the object just stated, is the provision of means whereby the sale of such certificates of deposit by correspondence may be facilitated.

These two objects are concurrently attained, and the nature of the entire improvement may be briefly stated as follows:

I provide, detachably connected to a certificate of deposit or the like form of negotiable paper, a foil, which bears on its face indicia to the effect that it is a tender to the bank named in the certificate, of a sum of money specified in both foil and certificate, and a request that said attached certificate may be filled out by the bank so that it will constitute a certificate of deposit for the amount stated, payable on demand to the order of the person who signs the foil, provided said person, hereinafter termed depositor, shall sign his name upon the certificate to correspond with the signature on the foil. In the practical use of this device, the foil and connected certificate are presented to the bank with the necessary sum of money, the depositor signing his name in an appropriately designated space on the foil. The bank indicates upon both foil and certificate the date upon which the money is received by it, and fills out the certificate. The foil is now detached from the certificate and retained by the bank. According to the terms of the certificate it is not negotiable until counter-signed by the depositor to correspond with his signature on the foil; consequently there is the maximum of protection to the depositor and the depositary. The security to intermediate parties arises from the fact that the depositor's signature does not appear at all upon the certificate until such time as he is ready to make it negotiable, so that there is nothing to guide a would-be forger, and a forgery will be the more palpable and easily traced.

Further objects and advantages of my device will appear in the course of the following specification, reference being had to the drawing, which is a face view of a two-part instrument embodying the invention.

It is to be understood that while I have shown the invention embodied in connection with a particular form of negotiable instrument, its scope is not to be limited correspondingly, but I contemplate any use or application of the invention not inconsistent with the meaning of the appended claim.

Referring to the numerals on the drawings, 1 indicates a foil, to which is detachably connected a form of negotiable instrument 2. The foil 1 bears on its face indicia to the effect that it constitutes a tender to a specified depositary of a specified sum and a request that said depositary issue to the presenter a certificate according to the terms and conditions contained in the attached form 2. The said foil is adapted to be signed by the presenter or depositor, and bears on its face means for dating it, preferably a dating table 4. The said foil and its attached instrument bear corresponding serial numbers or the like identifying marks 5, and are adapted to be correspondingly marked for identification in other ways hereinafter appearing to the end that the part 1 may become properly a foil or identifying part for the member 2.

The form 2 in the embodiment illustrated bears upon its face indicia to the effect that a named depositary (being the one referred to in the foil) has received from a depositor (being the one named in the foil) a sum definite of money (being the sum named in the foil) and that said sum will be paid to the order of a person named on the return of the instrument 2 properly indorsed and counter-signed, with interest at a specified rate providing that said certificates is counter-signed by the depositor, and otherwise marked to show its correspondence with the foil. Below the body of the instrument as thus described, there is an appropriately designated space 10 for the signature of the depositor named in the body of the instrument, and appropriately designated places for the certification of the instrument by the depositary and its proper official or officials.

The said certificate bears a dating table similar in all respects to that which appears on the foil 1, and the said tables are so arranged upon the foil and certificate respectively that when the foil and certificate are folded one upon the other along the line of perforation 6 which constitutes the connection between them, they will coincide so that punch marks indicating a particular date may be made in both tables simultaneously. Both the foil and certificate may in like manner be provided with similar interest tables 7, adapted to coincide and be correspondingly punched when the parts are folded as described.

The device above described is adapted to be used either in the ordinary way like the Moore certificate referred to, but is particularly adapted for use in connection with banking by correspondence. In such use the certificates and attached foil being in the possession of an individual, he has only to sign his name to the foil and send the foil, certificate, and required amount of money, to the bank. Upon receipt by the bank, the cashier or other officer folds the certificate and foil one upon the other, inserts the depositor's name in the space 8 of the certificate, punches the date of the receipt of the money (which is also the date of issue of the certificate and the date from which interest thereon begins to run), properly certifies the certificate by signing his name as treasurer or cashier, or whatever official he may be, and impresses an official seal of the bank through the paper of both certificate and foil, and so that said seal will cut through his own signature on the certificate.

The signature space on the foil and the signature space of the cashier on the certificate have such an arrangement that when the two parts are folded one upon the other they will be located in appropriately corresponding areas of the respective papers, so that as shown in the drawing the seal impressed over the cashier's signature will be in juxtaposition to the signature of the depositor on the foil. In the present instance, the spaces upon the foil and certificate portion are indicated by circular marks which inclose spaces of suitable shape and size to receive the seal. These marks are so located that when the paper is folded upon the weakened line they will register with each other, and when the seal is impressed within one of said marks it will be impressed in juxtaposition to the signatures of the depositor and the cashier, as above described. Thus an element of protection is afforded, because when the certificate is returned to the bank it may be laid upon its foil and the correspondence of the seal positions ascertained. The foil is retained in the bank and the properly filled out certificate is returned to the depositor to be used by him at his pleasure. Should he desire to save it and let interest accrue he does so, but may at any time use the certificate as an ordinary check or the like by signing his name in the space provided. When his name has been so signed the amount named on the instrument will be paid to the specified payee, provided that the signature of the depositor on the certificate corresponds with that on the foil, and the other corresponding identification marks are found to exist in the foil and certificate by the bank. The interest tables may be punched by the bank at the time the certificate is returned, so that a permanent record is made of all moneys received and paid on account of the instrument.

It will be apparent that by the use of this device I have contrived to give to each party, that is, to the depositor and the depositary, an instrument in writing, the depositor receiving the evidence of indebtedness in the form of a certificate, and the depositary receiving the foil, which is at the same time a preventive against alteration of the certificate.

Another practical advantage is in the fact that when a debtor tenders his money he is assured of just the form of instrument which will come back to him for his money.

Other advantages might be pointed out, but these are thought to be obvious and such as will readily occur to one skilled in the art, and further mention thereof or of the practical use of the device is omitted.

What I claim is:—

In a device of the class described, a paper separated by a weakened line into two similarly shaped parts, each of said parts bearing similar headings and similar numbers, one of said parts having matter reciting a tender and the other bearing matter which constitutes it a certificate, each of said parts bearing indicia of the same sum of money, said tender part having an appropriately designated space for the signature of a depositor and said certificate part having spaces appropriately designated for the countersignature of the depositor and the signature of the party issuing the certificate, respectively, said certificate and said tender parts each having at the first named and last named of said signature spaces, respectively, a mark inclosing a space of suitable shape and size to receive a seal, and so located that when the paper is folded on said line said marks will register, whereby when the seal is impressed within one of said marks it will be impressed at the first named and last named of said signature spaces.

In testimony whereof I affix my signature in presence of two witnesses.

FRANK J. KENT.

Witnesses:
A. E. BORDNER,
L. M. HOPKINS.